May 5, 1970   J. E. CALLAN   3,510,744
INSTANTANEOUS PEAK CURRENT LIMIT CIRCUIT
Filed Aug. 22, 1968
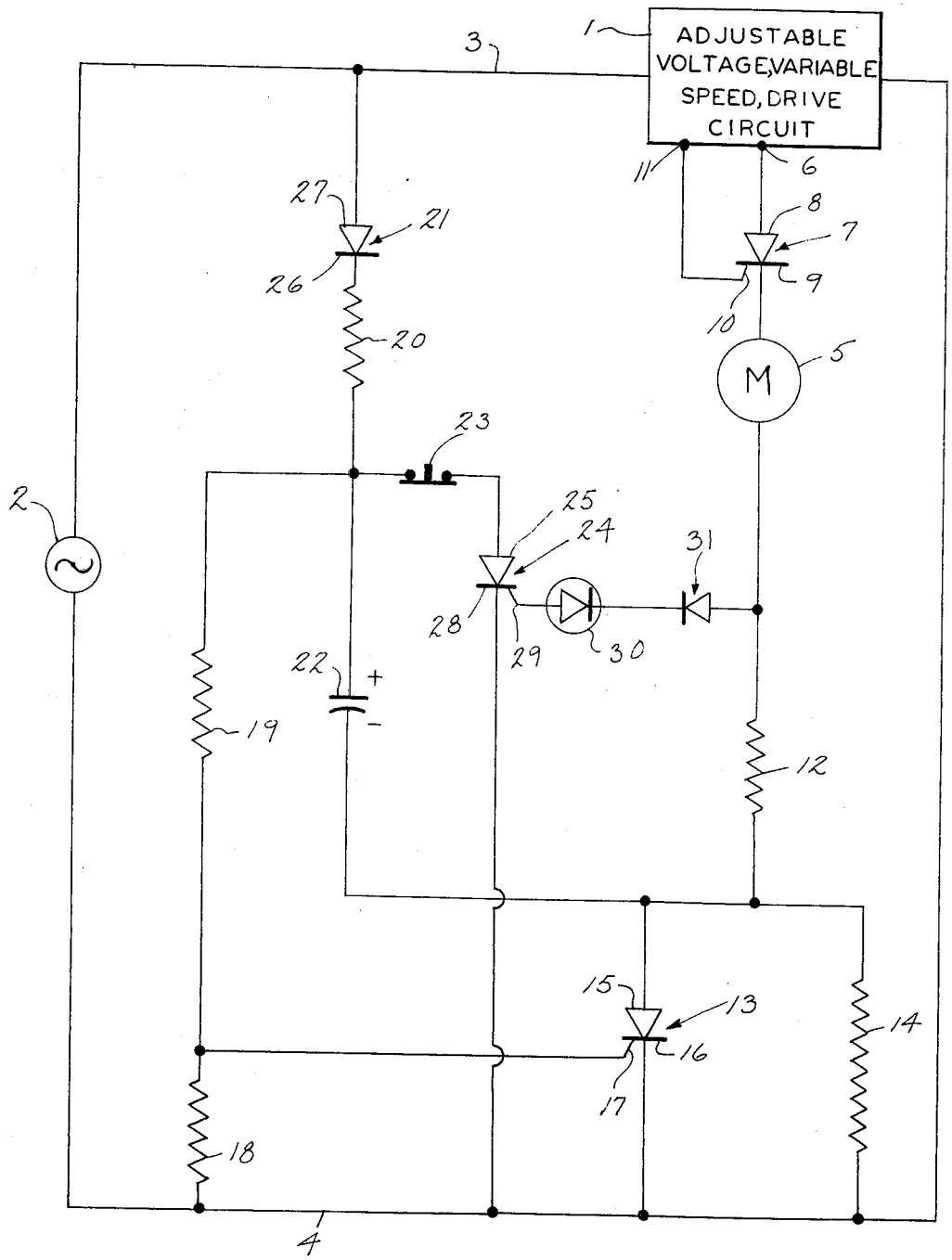
INVENTOR
JOHN E. CALLAN
BY Thomas O. Koehn
ATTORNEY

United States Patent Office 3,510,744
Patented May 5, 1970

---

3,510,744
INSTANTANEOUS PEAK CURRENT LIMIT CIRCUIT
John E. Callan, Milwaukee, Wis., assignor to Allen-Bradley Company, Milwaukee, Wis., a corporation of Wisconsin
Filed Aug. 22, 1968, Ser. No. 754,626
Int. Cl. H02p 7/62
U.S. Cl. 318—434          8 Claims

ABSTRACT OF THE DISCLOSURE

The armature of a permanent magnet motor is connected through an SCR and an adjustable voltage variable speed drive circuit across an A-C source. Two resistors are connected in series with the motor armature and a second SCR shunts across one of the resistors. A capacitor is connected in series with the second SCR and a rectifier across the A-C source. A third SCR is connected across the capacitor such that when the third SCR becomes conductive it imposes the charged capacitor across the second SCR to render the second SCR nonconductive. The gate circuit of the third SCR is connected through a Zener diode to the armature of the motor so that the third SCR will be conducted when a predetermined voltage is terminated across the first of the two resistors in series with the motor armature.

BACKGROUND OF THE INVENTION

The present invention was created to adapt a fractional horsepower adjustable voltage, variable speed drive circuit operating from a single phase A-C supply to control a D-C motor having a permanent magnet field, instead of the conventional wound field. With the conventional D-C motor, the controller supplies controlled half wave rectified voltage to the motor armature and a constant voltage to the motor field, and standard overload contacts were available, if indicated, for the particular applications. In adapting such a variable speed drive for use with a permanent magnet motor, a number of modifications were required, but one problem inherent in a permanent magnet motor particularly demanded solution, to wit: protection against demagnetization of the field magnet by instantaneous peak armature current overload. The overload contacts suitable for use with a conventional D-C motor were not fast enough to give the requisite protection to the permanent field magnets of the permanent magnet motors. The present invention solved that problem, not only with respect to fractional horsepower permanent magnet motors, but for all applications where a need for instantaneous peak current control exists.

Since the problem of current overload is as old as motors, current limiting devices are well known to the art. A standard means of limiting peak current has been the insertion of large resistances in series with the motor, but this simple device has several disadvantages, including inefficiency, overheating, and deterioration of motor regulation resulting from the large series resistances. For normal operation, maximum efficiency and more accurate control was achieved where a minimum resistance is connected in series with the motor.

Different types of current limiting circuits for D-C power supplies are summarized in an article by Gasser and Hug "Philips Technical Review," 1967, No. 8, vol. 27, pp. 251–257, entitled "Current-Limiting circuits for Transistorized Power Supplies." Further examples of current limit circuits in variable speed motor drives are disclosed in U.S. Pats. Nos. 3,108,214, 3,127,550, 3,177,418, 3,222,585 and 3,253,204. Such current limit circuits are designed to cope with the typical overload problems where the damage usually results from overheating of the motor or the auxiliary equipment and circuitry which generally requires some discernible time lapse. Those prior art devices are not directed at the prevention of demagnetization of permanent field magnets, which demagnetization can occur instantaneously, as a result of excessive transient in the armature circuit, for example.

SUMMARY OF THE INVENTION

The present invention relates to an instantaneous peak current limit circuit; and more specifically, the invention resides in the combination of a power source, a normally conductive polarity responsive switching device and a current limiting resistor connected in parallel with one another in series with said power source, a switching voltage source, and a normally nonconductive switching device connecting said switching voltage source across said normally conducting polarity responsive switching device and having a control element connected to said unidirectional power source to render said normally nonconductive switching device conductive when current from said unidirectional power source exceeds a predetermined maximum limit to connect said switching voltage source across said normally conductive polarity responsive switching device so as to render said normally conductive polarity responsive switching device nonconductive.

The foregoing combination makes it possible to drive an electric motor with a minimum resistance connected in series with the armature during normal operation. Equally, if not more important, the present invention achieves current limiting extremely rapidly, viz within microseconds. Note, particularly that the current limit of the present invention is not dependent upon cyclic armature voltage change for operation. When an excessive current appears in the armature circuit the instantaneous peak current limit device of the present invention responds immediately to switch a large resistance in series with the armature such as to dissipate the excessive current and thus effectively limit the instantaneous current in the armature circuit.

This also eliminates fuses otherwise necessary to protect switching circuit components, which are preferably SCR's. In general it may be said that an instantaneous peak current limit circuit according to the present invention requires few components, all of which are tried and proven to be reliable and stable. As the result the entire circuit is reliable, stable, efficient and economical.

BRIEF DESCRIPTION OF THE DRAWINGS

The drawing is a schematic diagram of an instantaneous peak current limit circuit embodying the present invention.

DESCRIPTION OF THE PREFERRED EMBODIMENT

In the drawing an adjustable voltage variable speed drive circuit 1 is represented by a box bearing that title and is shown to be connected across an A-C source 2 by A-C lines 3 and 4. The A-C source 2 in the embodiment shown is a single phase A-C supply. The adjustable voltage variable speed drive circuit 1 is a commercially available regulated speed drive manufactured by the assignee of this application. The armature of a D-C motor 5 is connected to an output terminal 6 in series with a silicon controlled rectifier 7 (hereinafter referred to by its more common appellation, SCR), which has its anode 8 connected to the output terminal 6 of the adjustable voltage variable speed drive circuit 1, its cathode 9 connected to the motor 5 and its gate 10 connected to its control terminal 11 of the adjustable voltage variable speed drive circuit 1. The SCR 7, for the purposes of this application can be viewed as a part of the adjustable voltage variable speed drive circuit 1, since it rectifies and controls the average voltage to the motor 5.

The adjustable voltage variable speed drive circuit contains a speed control potentiometer (not shown) by which the machine operator can set the desired speed for the motor 5. The adjustable voltage variable speed drive circuit can automatically control the acceleration of the motor 5 to the desired speed and regulate the speed of the motor 5 so as to maintain that speed, independent of any load that may appear on the motor 5. The adjustable voltage variable speed drive circuit 1, controlling the conductivity of the SCR 7 provides an nonadjustable time limit acceleration and ensures a cushion start for the motor 5. The motor 5 is thus powered with controlled half waves rectified voltage to its armature. Although in the embodiment shown a single phase, 120 volt, 60 cycle source 2 is shown, for larger motors, a 220 volt single phase 60 cycle supply is generally used and in other embodiments of the invention a multi-phase source 2 might also be used. Inasmuch as the adjustable voltage variable speed drive circuit 1 is not a part of the invention and is a commercially available item, further description of it here would serve no useful purpose.

The motor 5 is a D-C motor having a permanent magnet field, as distinguished from the conventional, wound field motor. In present use, such motors are relatively small motors (see "Oriented Ferrite Permanent Magnets for Small Direct Current Motors," by James Gollhardt, IEE CP 64–305). But with the development of new magnetic materials larger size permanent magnets D-C motors are becoming available (see "Permanent Magnetic Motor for Mills: Now Possible But How Practical?" by R. W. Murray, "The Iron Age," Feb. 23, 1967). Although the preferred embodiment of the invention is used with the permanent magnet field motor 5, there is nothing about the invention that restricts its use to such motors. On the contrary, the D-C motor 5 might be any load 5 connected to any power supply, represented by way of example here in the combination of the adjustable voltage variable speed drive circuit 1 and the SCR 7. It is the particular characteristics of the D-C motor 5 with permanent magnet fields that make the application of the present invention particularly advantageous, but the present invention will be equally advantageous as used with any other load 5 for which the same type of limitation of instantaneous peak current is desired or required.

In series with the motor 5, but on the opposite side of the motor 5 from the adjustable voltage variable speed drive circuit 1, is a voltage drop resistor 12. A current limiting resistor 14 and a shunt SCR 13 are connected in parallel with one another and in series between the voltage drop resistor 12 and the A-C line 4. For reason made apparent in the description infra, the shunt SCR 13 serves as a normally conductive switching device that shunts out the current limiting resistor 14.

The shunt SCR 13 has an anode 15 connected through the voltage drop resistor 12 to the motor 5 and its cathode 16 connected to the A-C line 4. A gate 17 of the shunt SCR 13 is connected through one voltage drop resistor 18 to the A-C line 4, and it is connected in series with two other voltage drop resistors 19 and 20 and a rectifier diode 21 to the other A-C line 3. The rectifier diode 21 and the voltage drop resistor 20 are connected through a storage capacitor 22 to the anode 15 of the shunt SCR 13.

The diode 21 and drop resistor 20 are also connected through a normally closed stop push button 23 and a control SCR 24 to the A-C line 4. The control SCR 24 has an anode 25 connected through the normally closed push button 23 and the voltage drop resistor 20 to the cathode 26 of the rectifier diode 21, the anodes 27 of the rectifier diode 21 being connected to the A-C line 3.

The control SCR 24 has its cathode 28 connected to the A-C line 4, and gate 29 of the control SCR 24 is connected through a Zener diode 30 and a blocking diode 31 to the armature circuit of the motor 5, between the motor 5 and the voltage drop resistor 12 that is in series with the motor 5.

The gate 29 of the control SCR 24 may be considered to be in parallel with said drop resistance so when a voltage sufficient to break over the Zener diode 30 is developed across the voltage drop resistor 12, a trigger signal passes from the motor 5 to the gate 29 of the control SCR 24 to turn it on. Thus it is appropriate to consider the combination of the voltage drop resistor 12 and the Zener diode 30 a detector that detects an excess current in the armature circuit of the motor 5 and transmits a trigger signal to the gate 29 of the control SCR 24.

The operation of the instantaneous peak current limit circuit described can be best visualized, if the shunt SCR 13 that is connected in parallel with the current limiting resistor 14 is viewed as a normally conductive polarity responsive switching device 13 that can be converted to a nonconductive state by imposing a reverse voltage across it. Hence, during normal operation, the only resistance in series with the motor 5 is the relatively small voltage drop resistor 12, since the normally conducting polarity responsive switching device 13 in the form of the shunt SCR 13 shunts out the relatively large current limiting resistor 14. The firing signal for the shunt SCR is the half wave unidirectional signal from the A-C line 3 through the rectifier diode 21 and the two voltage drop resistors 18 and 19 to the gate 17 of the shunt SCR 13.

The control SCR 24 may be viewed as a normally nonconducting switching device 24 that is responsive to a triggering signal on its control element 29 (the gate 29), which is connected to the excess current detector means made up of the Zener diode 30 and the voltage drop resistor 12. The Zener diode 30 is selected such that its breakover voltage will approximately equal the voltage developed across the voltage drop resistor 12 in series with the motor 5 when the current through the motor 5 reaches the predetermined peak limit. When the peak limit current is reached, the voltage drop across the voltage drop resistor 12 will break over the Zener diode 30 causing a trigger signal to be conducted to the gate 29 of the control SCR 24 rendering the control SCR 24 conductive.

The storage capacitor 22 could be any voltage source that has one side connected to the anode 15 of the shunt SCR 13 and its other side connected to the anode 25 of the control SCR 24 so that when the control SCR 24 is rendered conductive by a trigger signal on its gate 29, the switching voltage source 22 is connected directly across the shunt SCR 13. It is essential that the polarity of the switching voltage source 22, i.e., the charge on the storage capacitor 22, be such that when the control SCR 24 becomes conductive and connects the source 22 across the shunt SCR 13, it renders the shunt SCR 13 nonconductive. To that end, the switching voltage storage capacitor 22 is connected to be charged through the restifier diode 21 in series with the anode 15 of the shunt SCR 13, so that the side which is connected to the rectifier diode 21 through the voltage drop resistor 20 must have a positive charge. It is this positively charged side of the storage capacitor 22 that is therefore connected to the cathode 16 of the shunt SCR 13 by the control SCR 24 when it becomes conductive.

So long as the control SCR 24 is conductive, it will shunt out any firing signals to the shunt SCR 13 and the shunt SCR 13 will remain nonconductive. As soon as the current through the motor 5 is restored to its normal level, the trigger signal is blocked from the gate 29 of the control SCR 24 by the Zener diode 30 so that the control SCR 24 becomes nonconductive, when the voltage across its anode 25 and cathode 28 drops at the end of the half cycle. Thus a forward voltage gradient is restored across the shunt SCR 13 to render it conductive again, to shunt out the current limiting resistor 14 from the armature circuit of the motor 5.

Thus the economical circuit of the present invention instantaneously limits the peak current from any power source regardless of the time during the cycle when the current excess may occur. Moreover, this is accomplished without burdening the circuit with high resistance during normal operation. The speed and reliability of the circuit embodying the present invention would be sufficient to recommend it, but it is also very economical and highly efficient. Many components may be substituted for those shown here and many other variations and modified embodiments of the invention will be conceived by those skilled in the art. Hence, the invention is not only the embodiment described above, but is formed in all embodiments of the subject matter particularly pointed out and distinctly claimed in the following claims.

I claim:

1. A peak current limit circuit comprising the combination of:
   an electrical power source;
   a peak current limiting resistance connected in series with said electrical power source;
   a shunt switching device connected in parallel with said peak current limiting resistance and being normally conducting to shunt out said peak current limiting resistance;
   said shunt switching device being responsive to a reverse voltage across it to convert it to a nonconductive state;
   a switching voltage source;
   a control switching device being normally nonconductive being connected between said switching voltage source and said shunt switching device so as to be able to switch a reverse voltage from said switching voltage source across said shunt switching device, and having a control element responsive to a triggering signal to convert said control switching device to a conductive state;
   and a detector means connected between said electrical power source, and said control element, and adapted to transmit a triggering signal to said control element when current from said electrical power source exceeds a preset maximum.

2. A peak current limit circuit as set forth in claim 1 wherein:
   a load is connected in series with said electrical power source and said shunt switching device.

3. A peak current limit circuit as set forth in claim 1 wherein:
   said switching voltage source is a storage capacitor connected to be charged in series with said shunt switching device.

4. A peak current limit circuit as set forth in claim 2 wherein:
   said shunt switching device is an SCR.

5. A peak current limit circuit as set forth in claim 3 wherein:
   said control switching device is an SCR.

6. A peak current limit circuit as set forth in claim 5 wherein:
   said detector means includes a voltage drop resistor connected in series with said electrical power source and said shunt switching device, and a Zener diode connecting said voltage drop resistor to said control element such that said control element may be in parallel with said voltage drop resistor.

7. A peak current limit circuit comprising the combination of:
   a unidirectional power source emitting a current the maximum peak value of which is to be limited;
   a voltage drop resistance connected to said unidirectional power source;
   a polarity responsive shunt switching device and a current limiting resistance connected in parallel with one another and in series with said unidirectional power source, said polarity responsive switching device being normally conductive to shunt across said current limiting resistance and adapted to be rendered nonconductive by an instantaneous change in polarity across it;
   a switching voltage source;
   and a normally nonconductive control switching device having a control element connected in parallel with said voltage drop resistance, and being connected in series with said switching voltage source across said polarity responsive shunt switching device in polarity relationship to oppose the conductivity of said polarity responsive shunt switching device;
   said normally non-conductive control switching device being responsive to a signal developed across said voltage drop resistance to render it conductive when said signal exceeds a preset maximum.

8. A peak current limit circuit comprising the combination of:
   a D-C motor having its armature circuit connected to be energized through a drive circuit;
   a voltage drop resistor connected in series with said armature circuit;
   a shunt SCR and a current limiting resistor connected in parallel with one another and in series with said armature circuit, said shunt SCR being normally conductive to shunt out said current limiting resistor;
   a storage capacitor connected to be charged through a rectifier diode and connected in series with said shunt SCR;
   a control SCR being normally nonconductive, having an anode connected to said storage capacitor on an opposite side of said storage capacitor from said shunt SCR and having a cathode connected to a cathode of said shunt SCR;
   and a Zener diode connecting a gate of said control SCR to said voltage drop resistor so that said gate is across said voltage drop resistor from said cathode of said control SCR.

References Cited

UNITED STATES PATENTS 2,468,609    4/1949    Whitehouse _____ 318—430
3,372,304    3/1968    Kuipers _____ 318—332

ORIS L. RADER, Primary Examiner

L. L. HEWITT, Assistant Examiner

U.S. Cl. X.R.

318—332